DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 398

T914,001
POWDER COATING PROCESS

Peter M. Grant, Hemlock Park 37663, and Herbert R. Lyon, 128 Dahlia 37664, both of Kingsport, Tenn.

Filed Feb. 23, 1972, Ser. No. 228,760
Int. Cl. B05b *5/02;* B44d *1/094*
U.S. Cl. 117—17
No Drawing. 8 Pages Specification

Disclosed is a process for powder coating electrically nonconductive substrates, which can withstand a temperature within the range of about 375° F. to about 500° F. without deforming, charring, and the like, in selected areas. Suitable substrates are fabrics, paper products, glass, ceramics, thermosetting resins such as phenolics, ureaformaldehyde and ureamelamine resins, thermosetting polyesters and crystalline linear polyesters such as polyethylene terephthalate. In this process a grounded, electrically conductive, shaped coating is formed on a portion of the area of the side of an electrically nonconductive, heatable substrate. Both the coated portion of the side and a portion of the remaining area of the side are then contacted with charged polymer particles and the charged polymer particles adhere only to the electrically conductive shaped coating and not to the remaining area of the side of the substrate. The coated portion of the side is then heated to form the polymer particles into a coating which is fused to the grounded, electrically conductive shaped coating and in the same shape as grounded, electrically conductive shaped coating. The polymer particles can be comprised of cellulose ester, polyolefin, polyester or mixtures thereof. In one particularly advantageous embodiment the polymer can be composed of a mixture of poly (1,4 - cyclohexylenedimethylene terephthalate/isophthalate) and cellulose acetate butyrate.